UNITED STATES PATENT OFFICE.

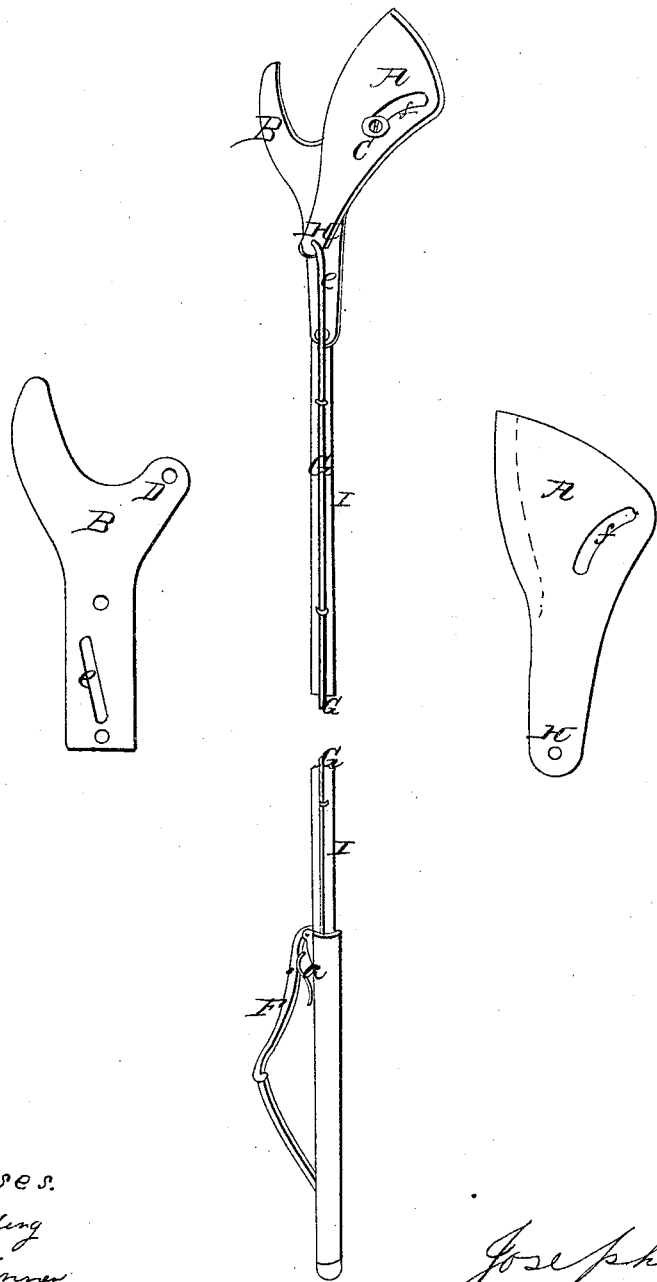

JOSEPH EVANS, OF NEWARK, NEW JERSEY.

IMPROVEMENT IN PRUNING-SHEARS.

Specification forming part of Letters Patent No. 48,803, dated July 18, 1865.

*To all whom it may concern:*

Be it known that I, JOSEPH EVANS, of the city of Newark, in the county of Essex and State of New Jersey, have invented an Improvement in Pruning-Shears; and I do hereby declare the following to be a full and exact description of the same, reference being had herein to the drawings that accompany this specification, forming part of the same.

My invention is an improvement upon the pruning-shears secured to me by Letters Patent bearing date July 16, 1861; and it consists in operating the shears in a way that dispenses with the knuckle-joints, the projecting of which was sometimes an inconvenience, and in substituting a drawing or sliding cut for the direct-pressure cut which I formerly used.

The parts A and B in the drawings are connected by the screw C, the part A of the shears being formed with a slot, $f$, in which the screw C can slide. The upper end of the wire G is attached to A at H, and slides on the pole I, the lower end being attached to the trigger F. The wire is moved thereby, being drawn down when the trigger F is pressed and returned upward when the pressure is released by means of the spring $a$ under the trigger F. A pin or projection of the wire G on the under side of A moves in the slot $e$, guiding the end of A.

Variations in the curves and inclinations of the slots will give any desired sliding cutting motion to the edge of the shears for leaving a clean, smooth surface on the part of the wood that is cut. The slot $f$ in A, when of the curve shown, gives to the cutting-edge a downward motion exceeding the forward cutting motion, the proportion in the excess decreasing as the edge descends, thus giving required greater force at the beginning and decreasing it towards the end of the cut, thus equalizing the expenditure of power on my patented trigger, which increases in force as it approaches the pole. I use a convex-edged cutting-knife and produce nearly a straight line of cut.

The part of the shears B is attached to the upper part of the pole I. As this pole and its appurtenances are secured to me by Letters Patent no further description thereof is needed here.

The advantages of my improvement are that the shears are light, effective, easily sharpened, and can have the cutting-blade removed and a new one put in its place at little trouble and expense. The shears are in the new form more easily introduced and operated in pruning thick or thorny bushes or shrubs.

I do not claim slotted shears nor any particular line of cutting; but

What I do claim, and desire to secure by Letters Patent, is—

The arrangement and combination of the parts of the shears in the manner and for the purpose specified, when used in combination with my already patented pole or holder, said patent bearing date July 16, 1861.

JOSEPH EVANS.

Witnesses:
W. H. GOODING,
CHAS. H. SKINNER.